(12) United States Patent
Bonny

(10) Patent No.: US 10,974,763 B1
(45) Date of Patent: *Apr. 13, 2021

(54) CONTROL ASSEMBLY FOR ZERO TURN DEVICE

(71) Applicant: Hydro-Gear Limited Partnership, Sullivan, IL (US)

(72) Inventor: Nathan W. Bonny, Shelbyville, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/571,528

(22) Filed: Sep. 16, 2019

Related U.S. Application Data

(63) Continuation of application No. 15/377,706, filed on Dec. 13, 2016, now Pat. No. 10,414,436.

(Continued)

(51) Int. Cl.
*B62D 11/00* (2006.01)
*B62D 11/04* (2006.01)
(Continued)

(52) U.S. Cl.
CPC .......... *B62D 11/006* (2013.01); *B60K 7/0007* (2013.01); *B60K 17/12* (2013.01);
(Continued)

(58) Field of Classification Search
CPC ...... B62D 11/006; B62D 11/04; B60K 17/30; F16H 21/44; H01H 25/04; G05G 9/047
See application file for complete search history.

(56) References Cited

U.S. PATENT DOCUMENTS

| 3,055,226 A | 9/1962 | Kiessling |
| 3,224,291 A | 12/1965 | Zimmerman |

(Continued)

FOREIGN PATENT DOCUMENTS

EP       2327607       4/2013

OTHER PUBLICATIONS

"Zero" Electric Mower, Specification Page, Lawless Industries Ltd., Obtained online at http://web.archive.org/web/20060430133400/http://www.zeromow.com/ on Nov. 19, 2007, 1 p.

(Continued)

*Primary Examiner* — Drew J Brown
(74) *Attorney, Agent, or Firm* — Neal, Gerber & Eisenberg LLP

(57) ABSTRACT

A control assembly for use with a vehicle having a pivot arm for controlling output of the vehicle includes a bracket, a yoke attached to the pivot arm, and a shaft engaged to the yoke and extending into the bracket. The pivot arm is rotatable about a first axis of rotation between a neutral position and a plurality of forward positions and a plurality of reverse positions. When in the neutral position, the pivot arm may also rotate about a second axis of rotation between an operative position and a stopped position, and a switch may be engaged when the pivot arm is rotated to the stopped position. A return to neutral assembly may provide a return force to the pivot arm when it is rotated about the first axis of rotation away from the neutral position.

20 Claims, 19 Drawing Sheets

Related U.S. Application Data

(60) Provisional application No. 62/272,474, filed on Dec. 29, 2015.

(51) Int. Cl.

| | | |
|---|---|---|
| *B60K 17/30* | (2006.01) | |
| *F16H 61/427* | (2010.01) | |
| *F16H 61/439* | (2010.01) | |
| *B60K 7/00* | (2006.01) | |
| *B60K 17/12* | (2006.01) | |
| *G05G 5/03* | (2008.04) | |
| *F16H 21/44* | (2006.01) | |
| *B60K 1/04* | (2019.01) | |
| *A01D 34/64* | (2006.01) | |
| *F16H 59/02* | (2006.01) | |
| *B60K 17/04* | (2006.01) | |

(52) U.S. Cl.
CPC .............. *B60K 17/30* (2013.01); *B62D 11/04* (2013.01); *F16H 61/427* (2013.01); *F16H 61/439* (2013.01); *G05G 5/03* (2013.01); *A01D 34/64* (2013.01); *B60K 1/04* (2013.01); *B60K 17/043* (2013.01); *B60K 2001/0416* (2013.01); *B60K 2007/0092* (2013.01); *B60Y 2200/223* (2013.01); *F16H 21/44* (2013.01); *F16H 2059/0295* (2013.01)

(56) References Cited

U.S. PATENT DOCUMENTS

| | | |
|---|---|---|
| 4,438,660 A | 3/1984 | Kittle |
| 4,753,618 A | 6/1988 | Entringer |
| 5,149,023 A | 9/1992 | Sakurai et al. |
| 5,502,957 A | 4/1996 | Robertson |
| 6,729,115 B2 | 5/2004 | Bartel |
| 6,782,797 B1 | 8/2004 | Brandenburg et al. |
| 7,134,276 B1 | 11/2006 | Langenfeld et al. |
| 7,299,610 B2 | 11/2007 | Piontek |
| 7,302,789 B2 | 12/2007 | Eavenson, Sr. et al. |
| 7,313,915 B1 | 1/2008 | Windhorst et al. |
| 7,458,311 B2 | 12/2008 | Korthals |
| 7,458,432 B2 | 12/2008 | Mayer et al. |
| 7,748,480 B2 | 7/2010 | Loxterkamp et al. |
| 8,240,420 B1 | 8/2012 | Bartel et al. |
| 8,459,137 B1 | 6/2013 | McCoy et al. |
| 8,522,901 B1 | 9/2013 | VanLue |
| 8,783,391 B2 | 7/2014 | Porter et al. |
| 9,313,953 B2 | 4/2016 | Borshov et al. |
| 9,499,199 B1 | 11/2016 | Laymon et al. |
| 2004/0000130 A1 | 1/2004 | Bartel |
| 2016/0179128 A1 | 6/2016 | Guglielmo |
| 2017/0037599 A1 | 2/2017 | Binstock et al. |
| 2017/0086376 A1* | 3/2017 | Burns .................... A01D 34/64 |
| 2020/0000039 A1* | 1/2020 | Reese .................... A01D 69/10 |

OTHER PUBLICATIONS

Control Devices, Specification Sheet, Oct. 3, 2014, 3 pp.
Gerald, et al., "A new generation of contactless magnetic position sensors," Moving Magnet Technologies, 2006, 7 pp.
Honeywell Datasheet, Hall-Effect Rotary Position Sensors, RTY Series, Honeywell International Inc., Mar. 2016.
Seastar Electronic Shift & Throttle Quick Reference Guide, Marine Canada Acquisition Inc., 2014.
Seastar Solutions Installation Manual, Electronic Shift & Throttle (EST), i6800 Shift & Throttle System, 2014.
Technik, Position Transducers and Rotary Sensors, novotechnik, Siedle Group, Nov. 2008, 36 pp.

* cited by examiner

CONTROL ASSEMBLY FOR ZERO TURN DEVICE

CROSS REFERENCE

This application is a continuation of U.S. patent application Ser. No. 15/377,706, filed on Dec. 13, 2016, which claims the benefit of U.S. Provisional Patent Application No. 62/272,474, filed on Dec. 29, 2015. These prior applications are incorporated herein by reference in their entirety.

BACKGROUND

The disclosure herein relates to a control assembly used to improve control of vehicles using zero turn drive systems. Other applications requiring separate controls of multiple outputs will be understood.

SUMMARY

It is known to use a return to neutral assembly on, e.g., the swash plate control arms of a hydrostatic transmission, to bias the transmission to return to a neutral position when the operator is no longer applying a driving force to the vehicle controls. Such a setup is less desirable or not possible in connection with certain hybrid or electric vehicles such as those disclosed herein, or in connection with an electric actuator. The speed control assembly disclosed herein therefore includes a return to neutral assembly engaged to each pivot bar (or pivot arm) of a vehicle to provide a return to neutral force (or return force) directly thereto, to improve performance and operator control. In certain embodiments, a damper may be incorporated in the speed control assembly to damp this return to neutral bias.

A better understanding of the disclosure will be obtained from the following detailed descriptions and accompanying drawings, which set forth illustrative embodiments that are indicative of the various ways in which the principals of the invention may be employed.

DETAILED DESCRIPTION OF THE DRAWINGS

Figure 1:
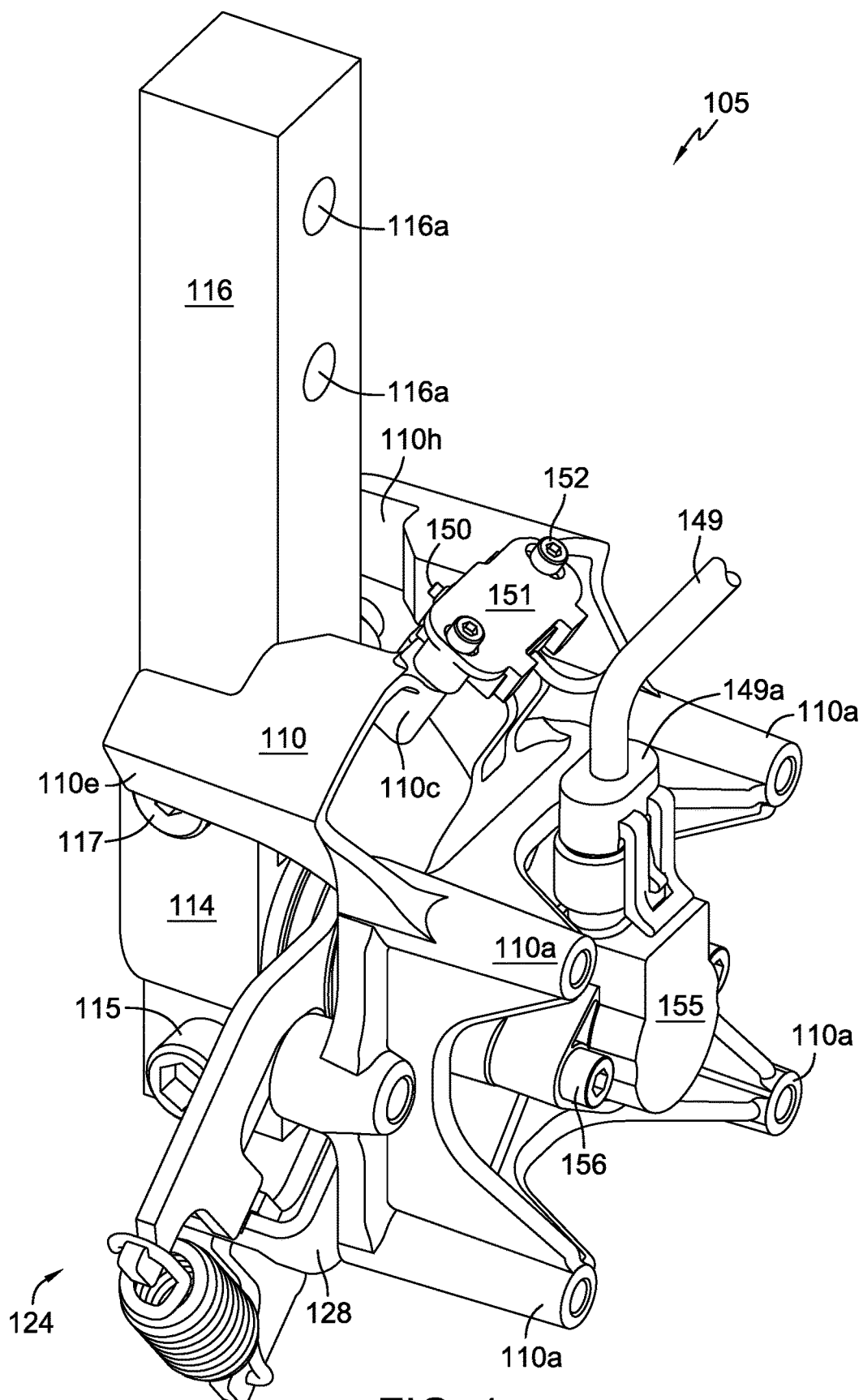
FIG. 1 is a right side (as oriented in vehicles disclosed herein) perspective view of a control assembly in accordance with the teachings herein.

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. In certain cross-sectional views, not all elements (such as input shafts) are shown as cross-sectioned, where such cross-sectioning would overly complicate the figures and not aid in the understanding of the disclosure. This specification is intended to be taken as a whole and interpreted in accordance with the principles of the invention as taught herein and understood by one of ordinary skill in the art.

Figure 17:
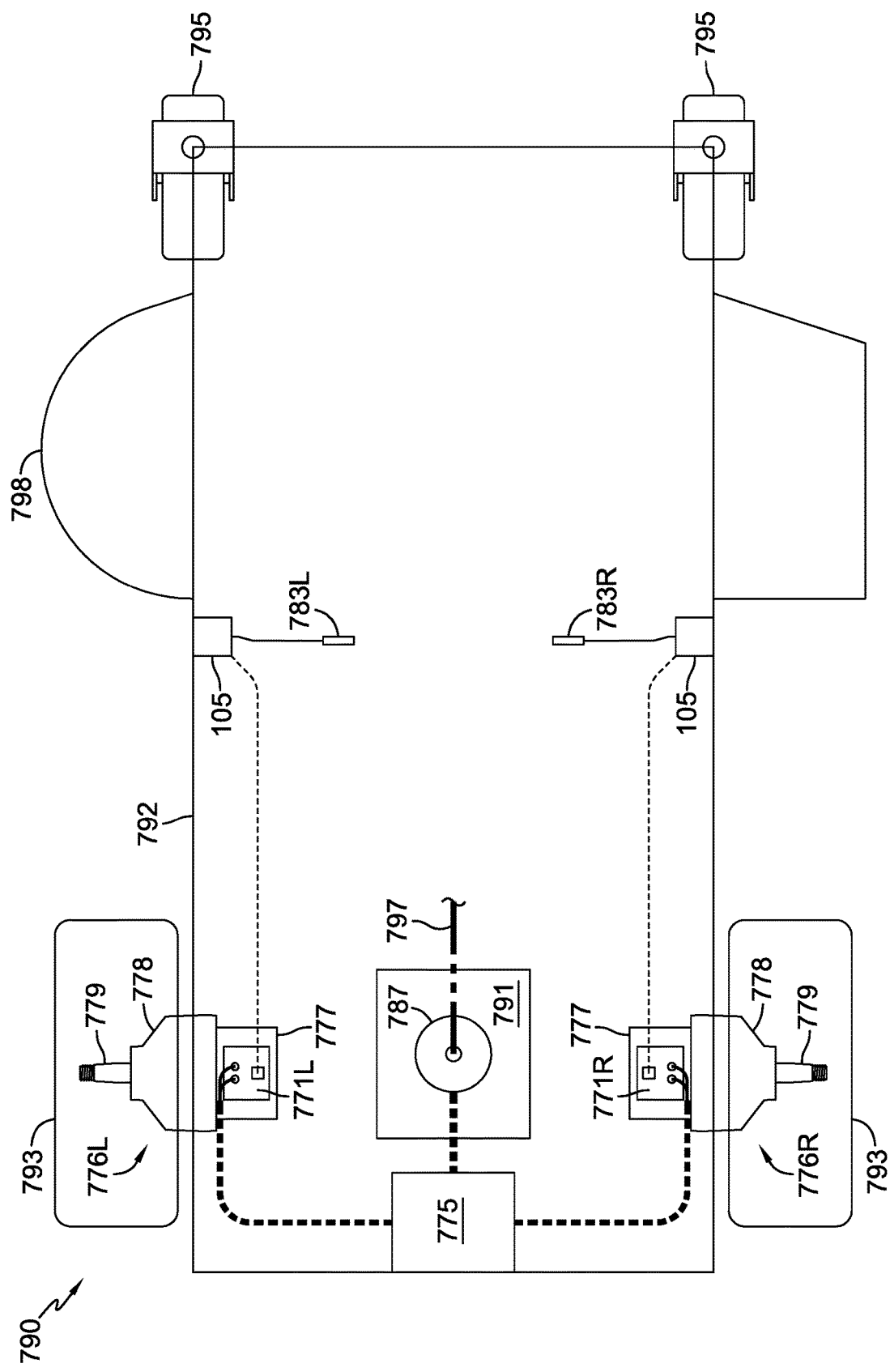
FIG. 17 is a schematic representation of a first exemplary hybrid vehicle incorporating a control assembly in accordance with the teachings herein.
Figure 18:
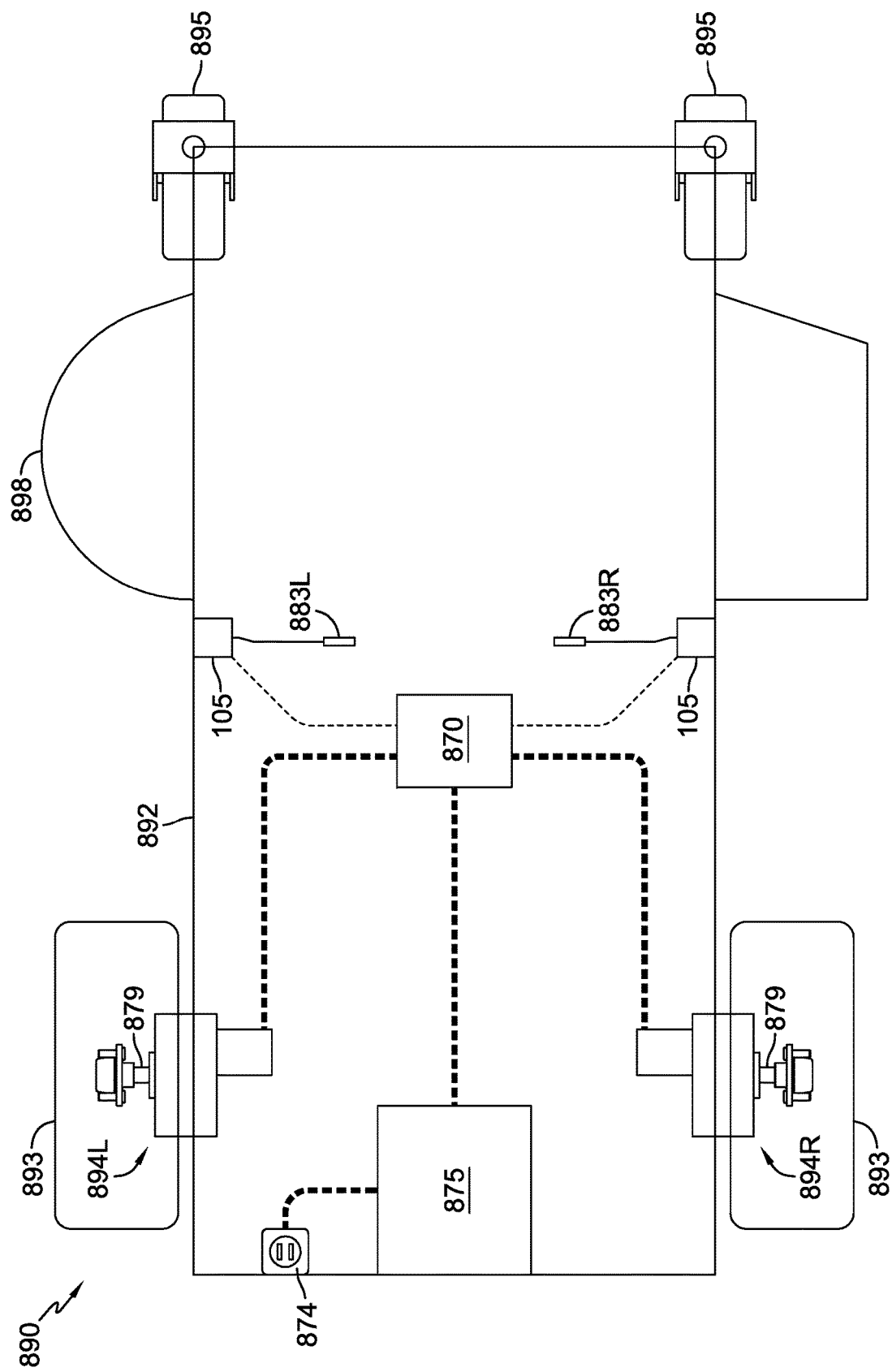
FIG. 18 is a schematic representation of a second exemplary vehicle using an electric drive and incorporating a control assembly in accordance with the teachings herein.
Figure 19:
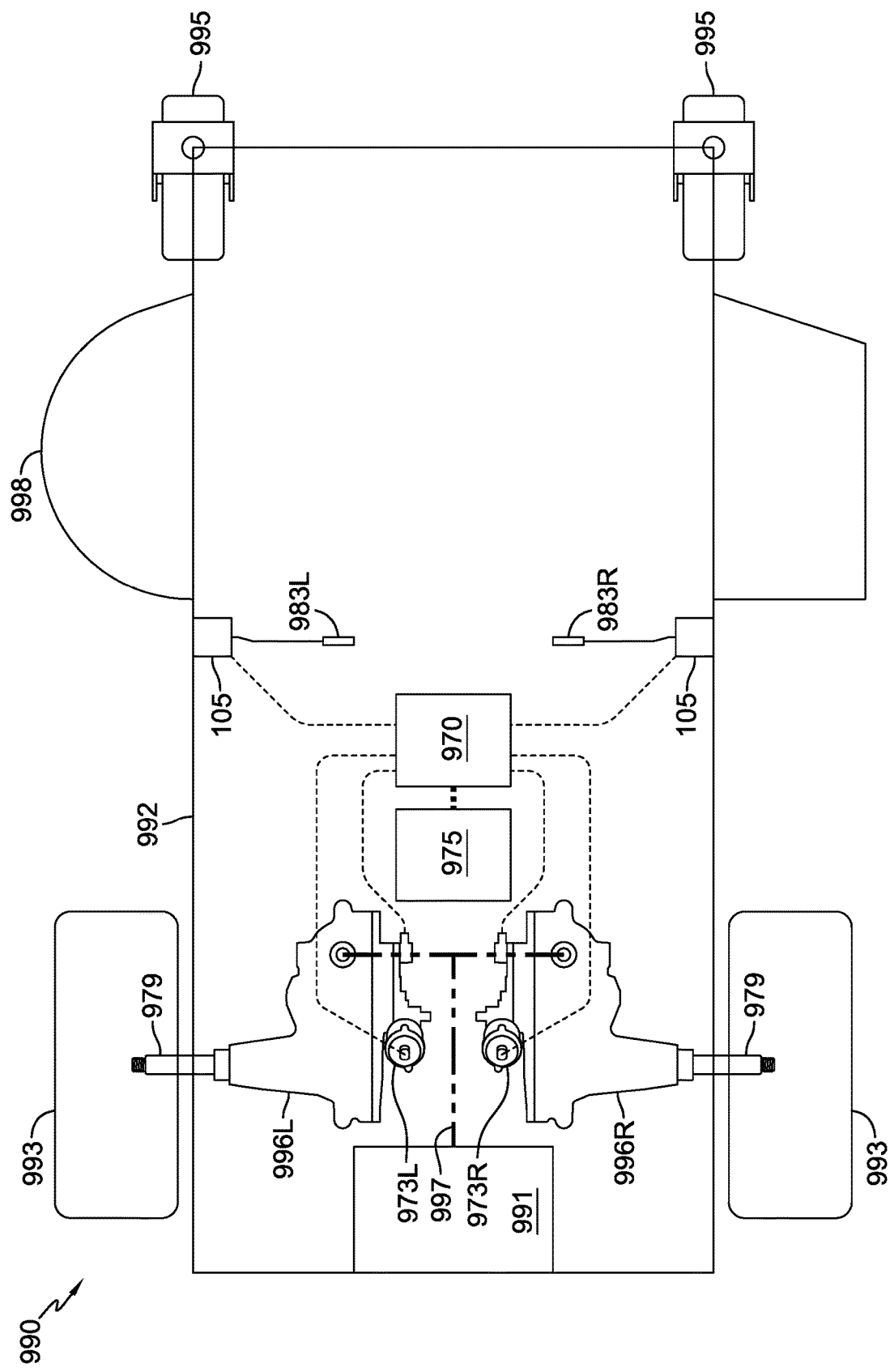
FIG. 19 is a schematic representation of a third exemplary vehicle using a hydrostatic drive and internal combustion engine, and incorporating a control assembly in accordance with the teachings herein.

The various speed controls disclosed herein may be used in vehicles such as zero turn lawn and garden tractors, and exemplary vehicles using different types of drive members are depicted herein in FIGS. 17-19. FIG. 17 depicts an exemplary hybrid vehicle 790 on which the control assembly disclosed herein may be used. Vehicle frame 792 supports an optional mowing deck 798 and a pair of front casters 795, along with battery 775 and internal combustion engine 791. Engine 791 drives generator 787 and a standard belt and pulley system 797. A pair of electric transaxles 776L, 776R, each having an electric motor 777, is disposed on opposite sides of vehicle frame 792 and each electric motor 777 drives a gear reduction 778 and an output axle 779 to power a driven wheel 793.

A first integral motor controller 771L is operatively connected to electric transaxle 776L and powered by battery 775. A second integral motor controller 771R is operatively connected to electric transaxle 776R and powered by battery 775. In the vehicle 790 depicted in FIG. 17, a pair of speed control mechanisms 105 is connected to respective control levers 783L, 783R. A first embodiment of an exemplary speed control mechanism 105 is depicted in FIGS. 1-8. It will be understood that the other embodiments of the speed control mechanisms 205, 305 or 405 could also be used in the vehicles depicted in FIGS. 17-19.

FIG. 18 depicts a second exemplary vehicle, and specifically an exemplary electric vehicle 890 that is similar in many respects to hybrid vehicle 790. As before, vehicle frame 892 supports an optional mowing deck 898 and a pair of front casters 895, along with battery 875. A charge receptacle 874 is also provided. A pair of electric transaxles 894L, 894R are disposed on opposite sides of vehicle frame 892. An integral drive controller 870 is operatively connected to each electric transaxle 894L, 894R and powered by battery 875, and controller 870 is also connected to the speed control mechanisms 105.

FIG. 19 depicts a third exemplary vehicle, and specifically vehicle 990 having an internal combustion engine 991 disposed on frame 992 and driving a pair of hydrostatic transaxles 996L, 996R. A drive controller 970 is connected to battery 975 and to the speed control mechanisms 105. Each hydrostatic transaxle 996L, 996R has its respective electric actuator 973L, 973R connected to drive controller 970, and drives one of the output axles 979 to power driven wheels 993. The hydrostatic transaxles may be similar in structure and operation to the transaxles depicted in commonly owned U.S. Pat. No. 7,134,276, the terms of which are incorporated herein by reference. As before a set of casters 995 is provided at the front of frame 992, and a mowing deck 998 is also provided.

Figure 2:
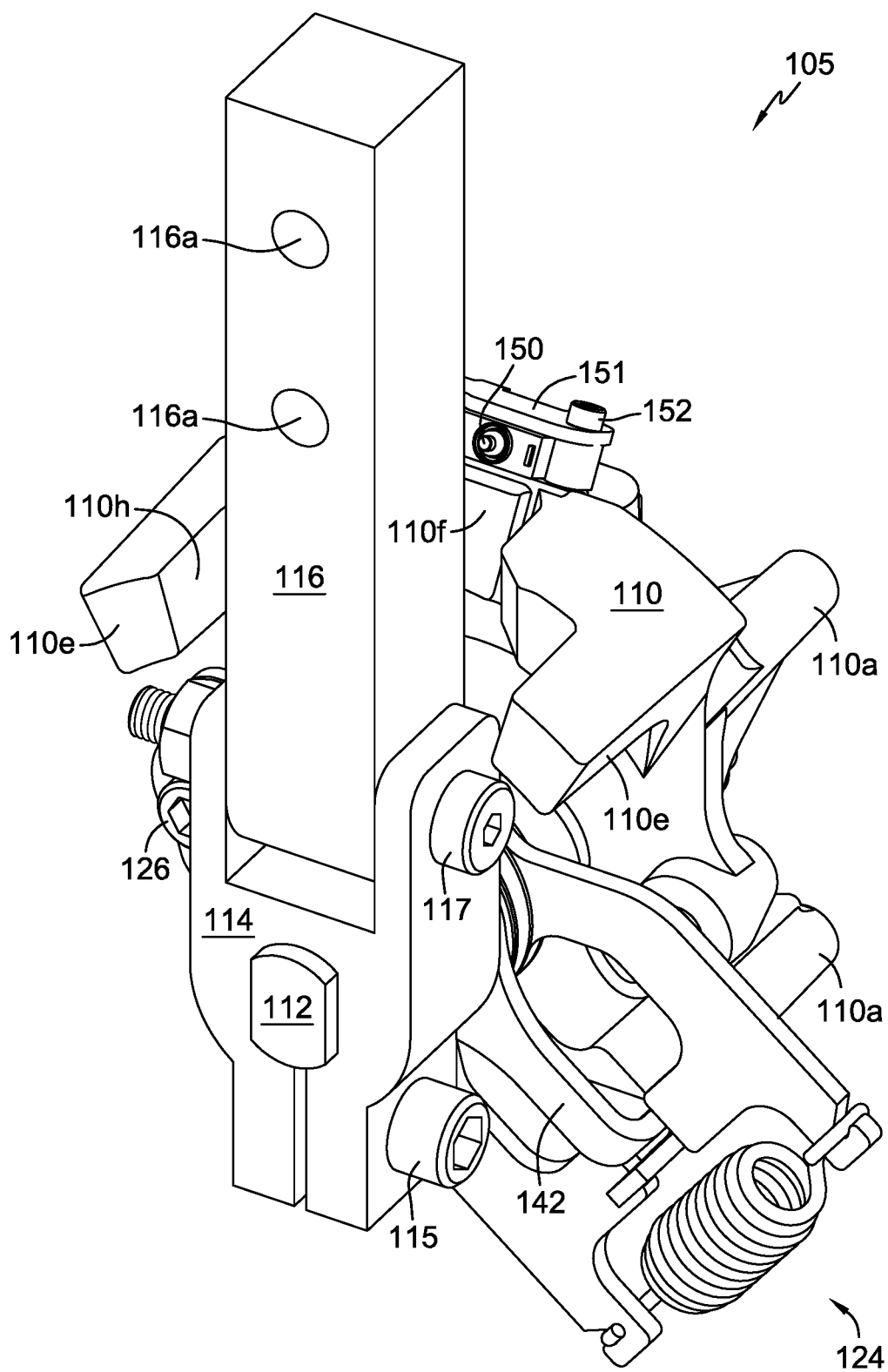
FIG. 2 is another perspective view of the control assembly of FIG. 1, rotated to reveal additional details.

As shown in the embodiment depicted in FIGS. 1-8, speed control mechanism 105 includes a pivot bar 116 for providing operator input, e.g., via control levers 783L, 783R described previously herein and attached to pivot bars 116 utilizing fasteners (not shown) to engage fastener openings 116a. In this embodiment, and similarly in subsequent embodiments described herein, a rotation of the pivot bar 116 about a first axis of rotation corresponds to forward and reverse movement of the vehicle, and a neutral position is provided. As shown in FIGS. 1 and 2, pivot bar 116 is in its operative position, where it may be rotated about a first axis of rotation, i.e., the axis of shaft 112, to a plurality of forward positions and a plurality of reverse positions. Pivot bar 116 is depicted in these FIGS. 1 and 2 as being in a neutral position. It is also understood that when pivot bar 116 is in this neutral position, it may be pivoted about a second axis of rotation to a position where it engages a switch 150, as described in more detail below.

Bracket 110 is used to support the various components disclosed herein, and to connect speed control mechanism 105 to a vehicle frame 792 as disclosed elsewhere in this specification. A set of mounting bosses 110a is provided for securing the bracket 110 to additional vehicle structure. For convenience, reference is made herein to vehicle 790 in conjunction with the discussion of the speed control mechanism 105, and it will be understood that this mechanism and the teachings herein can be applied to the other vehicles disclosed herein as well as to other applications.

Pivot bar 116 is secured to a yoke 114 by means of a fastener 117, and is therefore also engaged to and controls rotation of shaft 112, and the axis of rotation of shaft 112 provides the first axis of rotation mentioned above. Yoke 114 is secured to shaft 112 by means of fastener 115. As described above, pivot bar 116 is rotatable about a second axis of rotation, namely the axis of rotation of fastener 117, to move from the operative position of FIGS. 1 and 2 to a neutral stop position (or stopped position), wherein pivot bar 116 engages a switch 150, which may be called a "neutral switch" herein. With respect to switch 150, and switches 250, 350 and 450 in other embodiments disclosed herein, it will be understood that this term is being used broadly to include switches that are preferably activated when the operator wishes to place the drive member(s) and the vehicle in a neutral state. Such a switch could be referred to as a park switch or a brake switch depending on the function thereof. For example, a switch 150 could activate an electrically applied brake (not shown) associated with the drive member (s) of the various vehicle embodiments herein. Alternatively, such a switch could be tied in with the engine circuitry to activate a "kill switch" in an internal combustion engine such as engine 791, 991. In the embodiment depicted in FIG. 17, for example, activation of a switch such as switch 150 may place the motor drivers in integrated motor controllers 771L, 771R in an unpowered state such that no drive output is provided to the respective axles 779. The FIG. 18 embodiment could similarly have a motor driver in drive controller 870 placed in an unpowered state when such a switch is activated. Finally, in the FIG. 19 embodiment, activation of the switch 150 could result in actuators 973L, 973R being placed in a neutral position.

Figure 3:
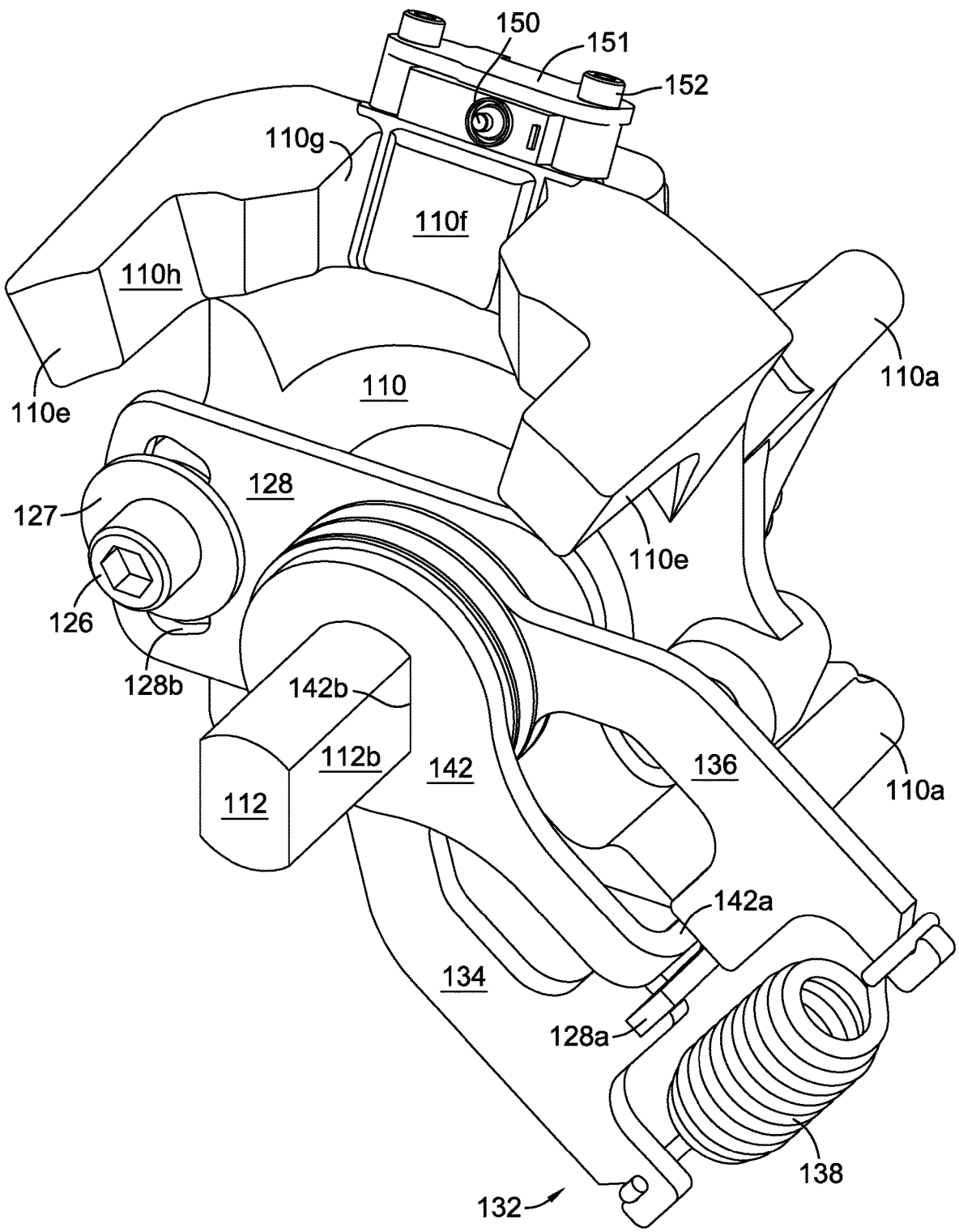
FIG. 3 is a perspective view of a portion of the control assembly of FIG. 1, oriented the same as FIG. 2, but with certain components removed for clarity.
Figure 4:
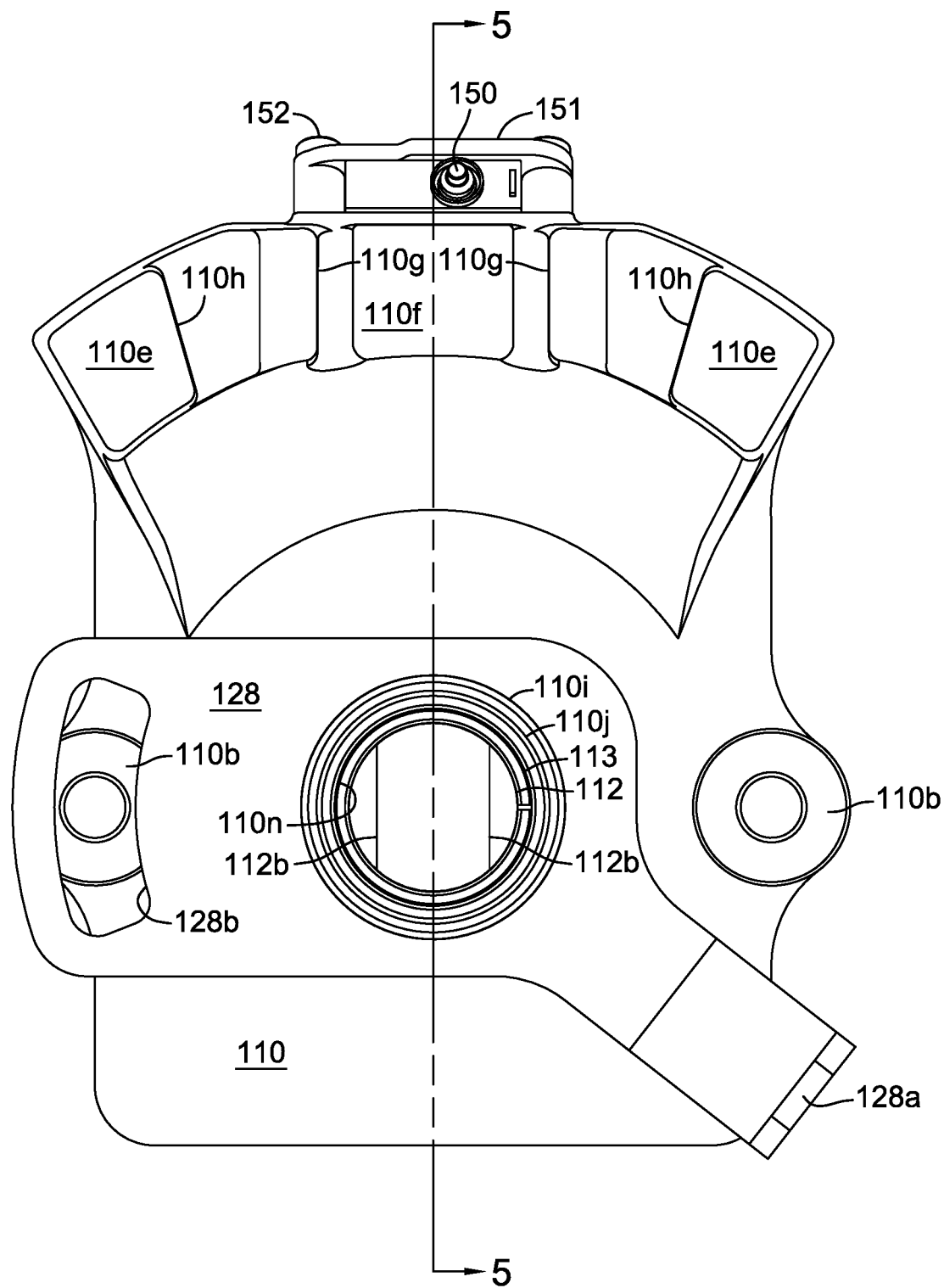
FIG. 4 is a side elevational view of certain components of the portion shown in FIG. 3.
Figure 5:
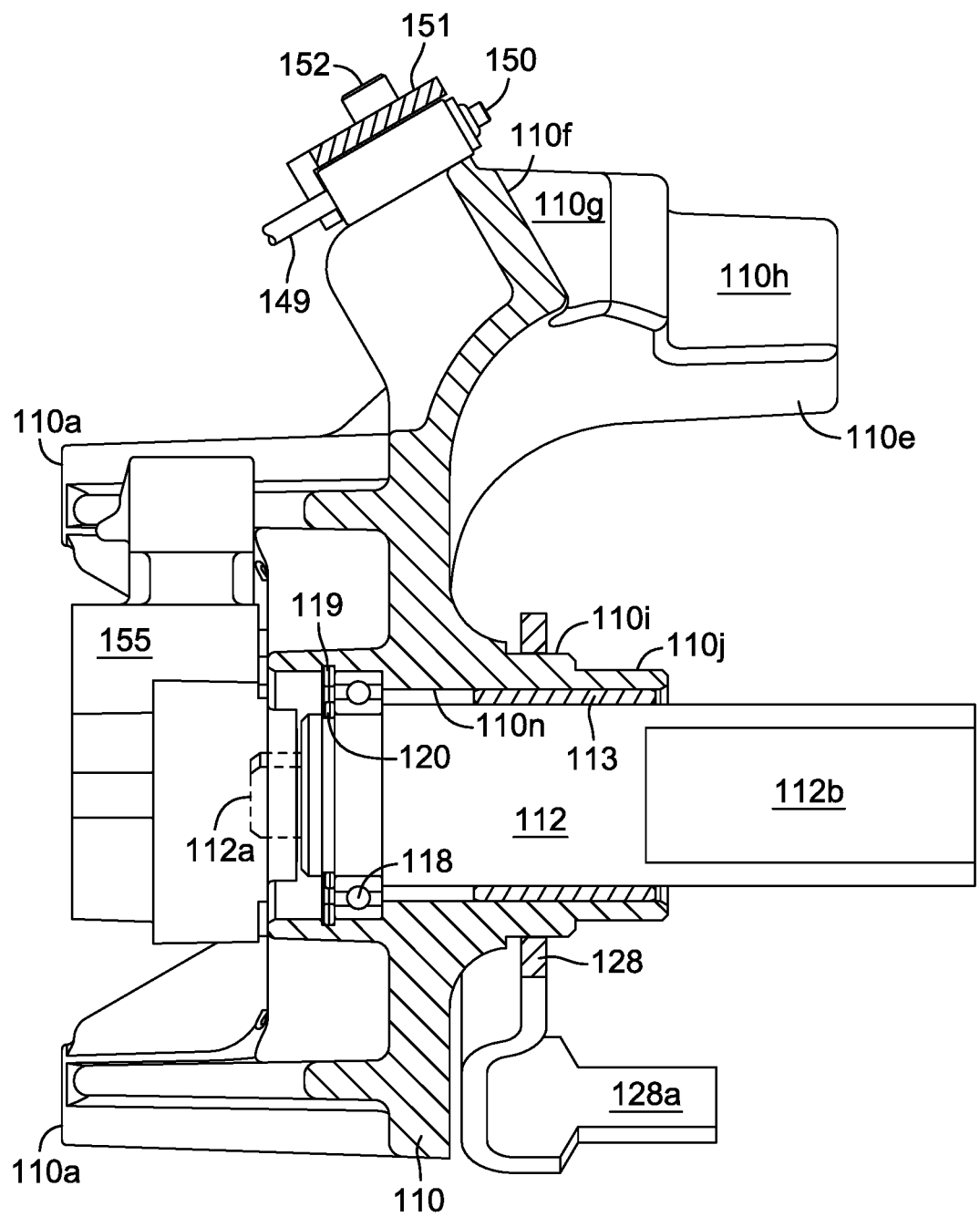
FIG. 5 is a cross-sectional view along the line 5-5 in FIG. 4.
Figure 6:
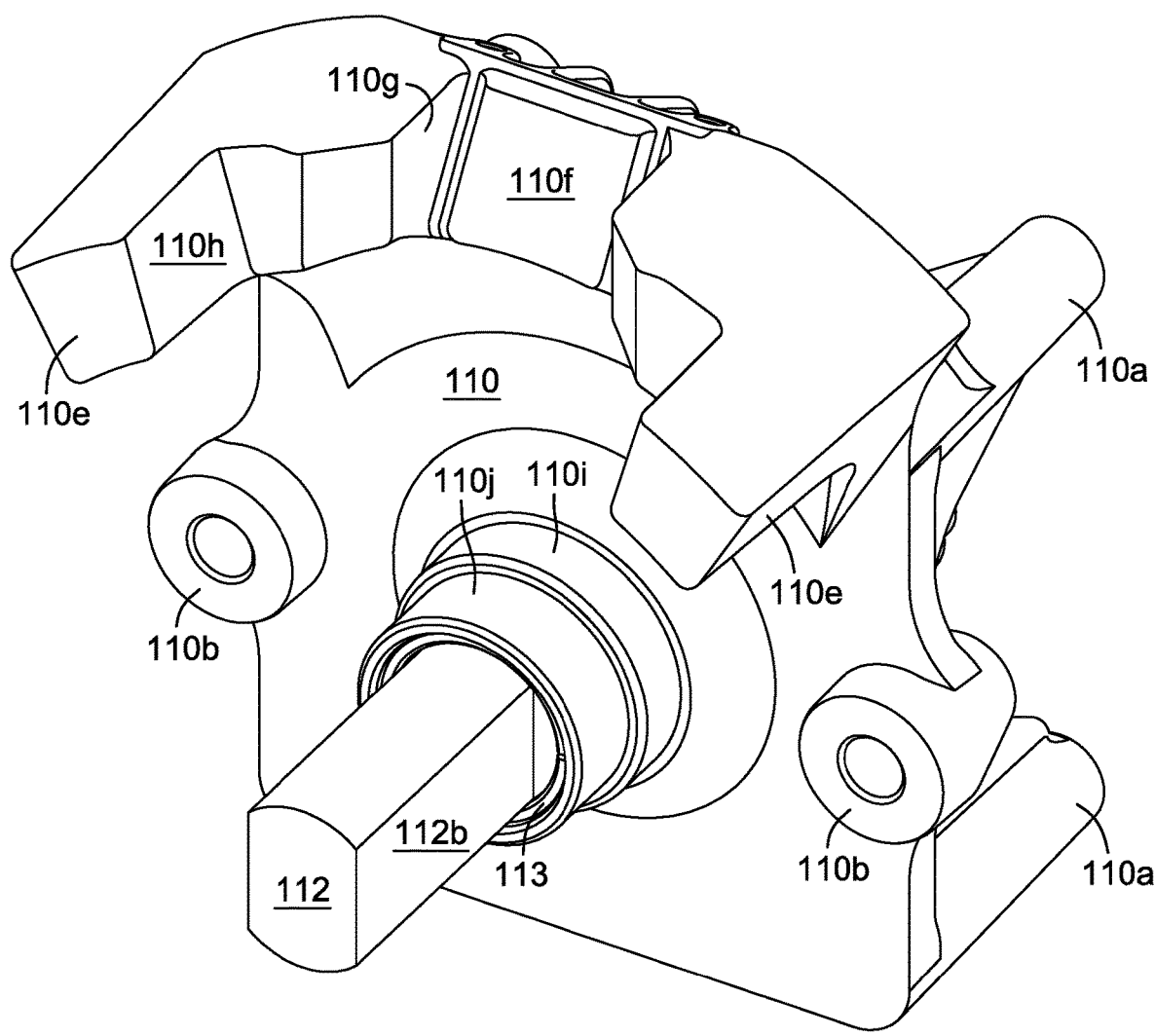
FIG. 6 is a perspective view of a bracket and shaft of the assembly of FIG. 1, oriented the same as in FIGS. 2 and 3.
Figure 7:
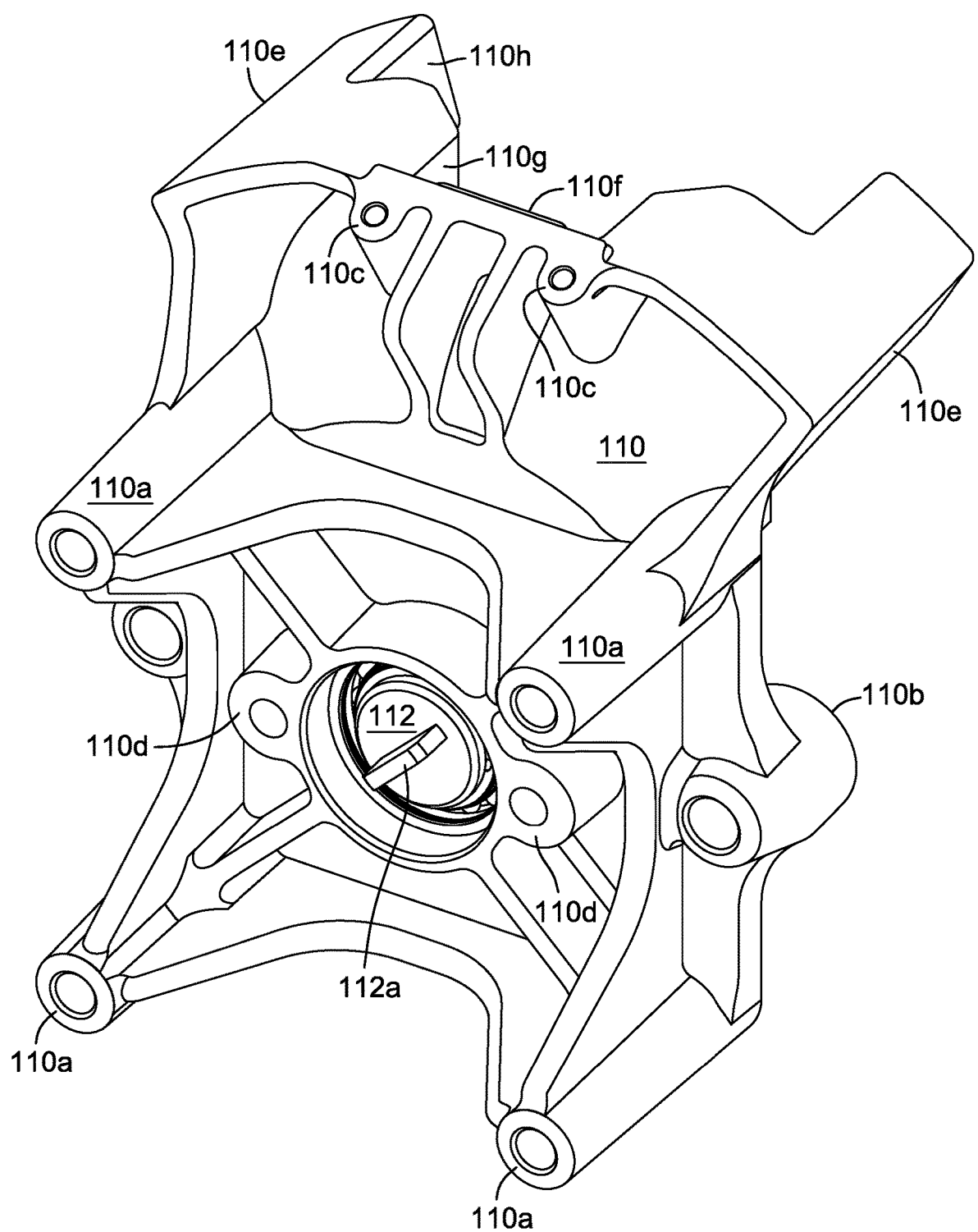
FIG. 7 is another perspective view of the bracket and shaft of FIG. 6, rotated 180 degrees in relation to FIG. 6.
Figure 8:
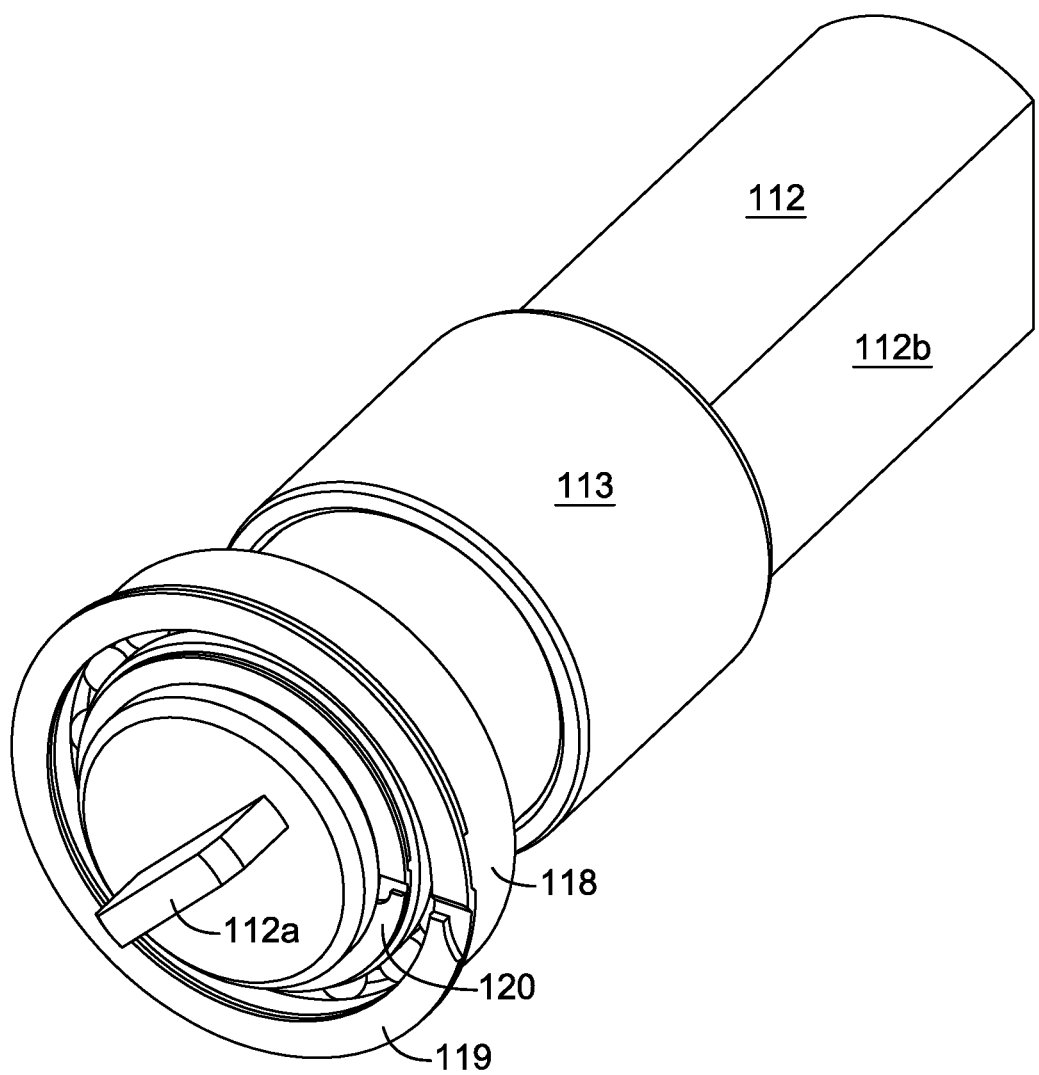
FIG. 8 is a perspective view of the shaft shown in FIGS. 6 and 7.
Figure 9:
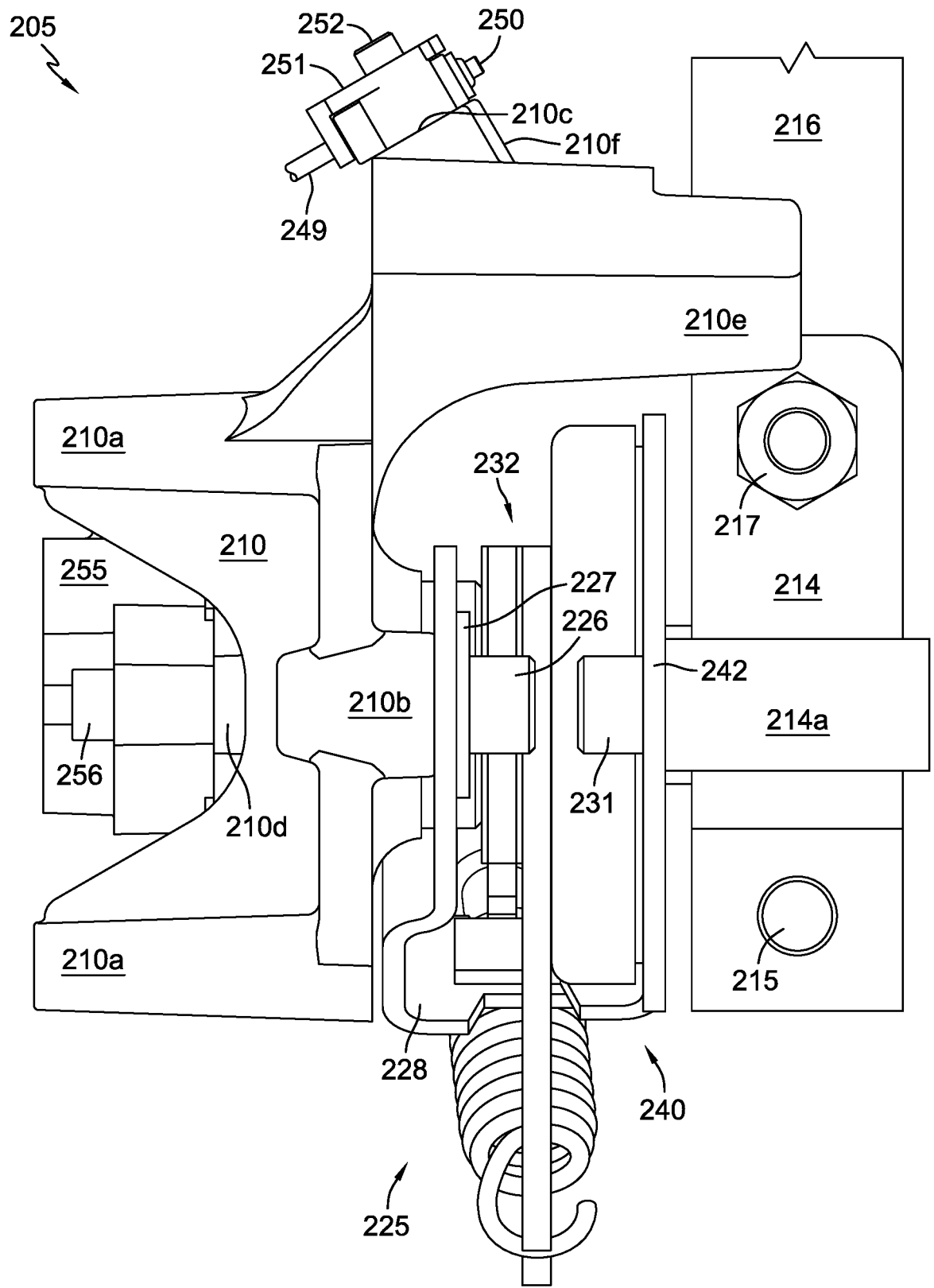
FIG. 9 is a right side (as oriented in vehicles described herein) front elevational view of a second embodiment of a control assembly in accordance with the teachings herein.

As shown more clearly in FIGS. 3 and 6, shaft 112 includes a pair of flats 112b to engage yoke 114 at its proximal end. As shown in, e.g., FIGS. 5 and 8, shaft 112 further includes a tang 112a to engage with analog position sensor 155, and is supported in bore 110n of bracket 110 by means of a shaft bushing 113 and sealed bearing 118. Shaft 112 is retained in place by means of retaining rings 119 and 120.

Bracket 110 includes a pair of arms 110e that provides stops 110h for limiting the range of motion of pivot bar 116 in the operative position. When pivot bar 116 is moved into the neutral stop position, a pair of neutral range stays 110g restricts forward and reverse rotation of pivot bar 116 and a neutral switch stop 110f is provided to limit movement of pivot bar 116 toward neutral switch 150 to prevent damage to neutral switch 150 during activation. Additionally, features (e.g., guide slots, not shown) of vehicle frame 792 or attachments thereto (not shown) may further limit movement of pivot bar 116 and/or associated control levers 783L, 783R.

As shown in, e.g., FIG. 1 analog position sensor 155 is secured to bracket 110 by means of fasteners 156 and sensor bosses 110d, and is connected to a wiring harness 149 by means of locking connector 149a to provide sensor data to, e.g., any of the controllers 771L, 771R, 870, 970 shown in FIGS. 17, 18 and 19. Similarly, neutral switch 150 is retained on bracket 110 by means of switch retainer 151 and fasteners 152 engaged to neutral switch bosses 110c.

As mentioned, when in the operative position, pivot bar 116 and yoke 114 are rotatable about the axis of shaft 112 to a plurality of different positions, including a neutral position, full forward and full reverse. A return to neutral (RTN) mechanism 124 of speed control mechanism 105, including a control arm 142, a scissors RTN subassembly 132, and a fixed neutral arm 128, can be seen most clearly in FIGS. 1-4, and is incorporated to provide a neutral return bias to pivot bar 116 when it is in the operative position and rotated either in the forward or reverse direction. Neutral arm 128 is mounted on a first machined step 110*i* and secured to bracket 110 by means of a neutral set screw 126 and lockdown washer 127 fastened to one of the neutral lockdown bosses 110*b* through opening 128*b*. A second neutral lockdown boss 110*b* is provided for flexibility of mounting the control mechanisms 105 on, e.g., opposite sides of a vehicle or with bias springs oriented differently. The RTN mechanism 124 can be similar in many respects to that disclosed in commonly owned U.S. Pat. No. 7,313,915, the terms of which are incorporated by reference herein.

The scissors RTN subassembly 132, rotationally mounted on a second machined step 110*j* adjacent to the first machined step 110*i*, consists of a first rotary arm 134 and a second rotary arm 136, both of which are connected to one another by means of a biasing spring 138. Rotation of shaft 112 in either a clockwise or counterclockwise direction will cause rotation of control arm 142, by means of interaction of flats 142*b* with shaft flats 112*b*, and extension 142*a* will contact and move either first rotary arm 134 or second rotary arm 136, depending on the direction of rotation, and biasing spring 138 will provide a return force to bias the pivot bar 116 back to the neutral position. Neutral arm extension 128*a* establishes the neutral return position of first rotary arm 134 and second rotary arm 136 when neutral arm 128 is secured in the neutral position as described previously herein.

As disclosed herein, scissors RTN subassembly 132 is bi-directional, to provide a return bias when pivot bar 116 is rotated in either the forward or reverse direction, but it will be understood that scissors RTN subassembly 132 could be made unidirectional upon minor modification of one of the rotary arms 134 or 136, e.g., as disclosed in commonly owned U.S. Pat. No. 6,782,797, the terms of which are incorporated by reference herein.

A second embodiment of a speed control mechanism 205 in accordance with these teachings is shown in FIGS. 9-13. As noted before, many of the components of this embodiment will be similar in structure to embodiments described elsewhere, and not every component shown in each embodiment will be described in detail where such description is not necessary or helpful to understanding this disclosure. As will be described in more detail below, this embodiment adds a rotary damper element to the return to neutral features.

Figure 10:
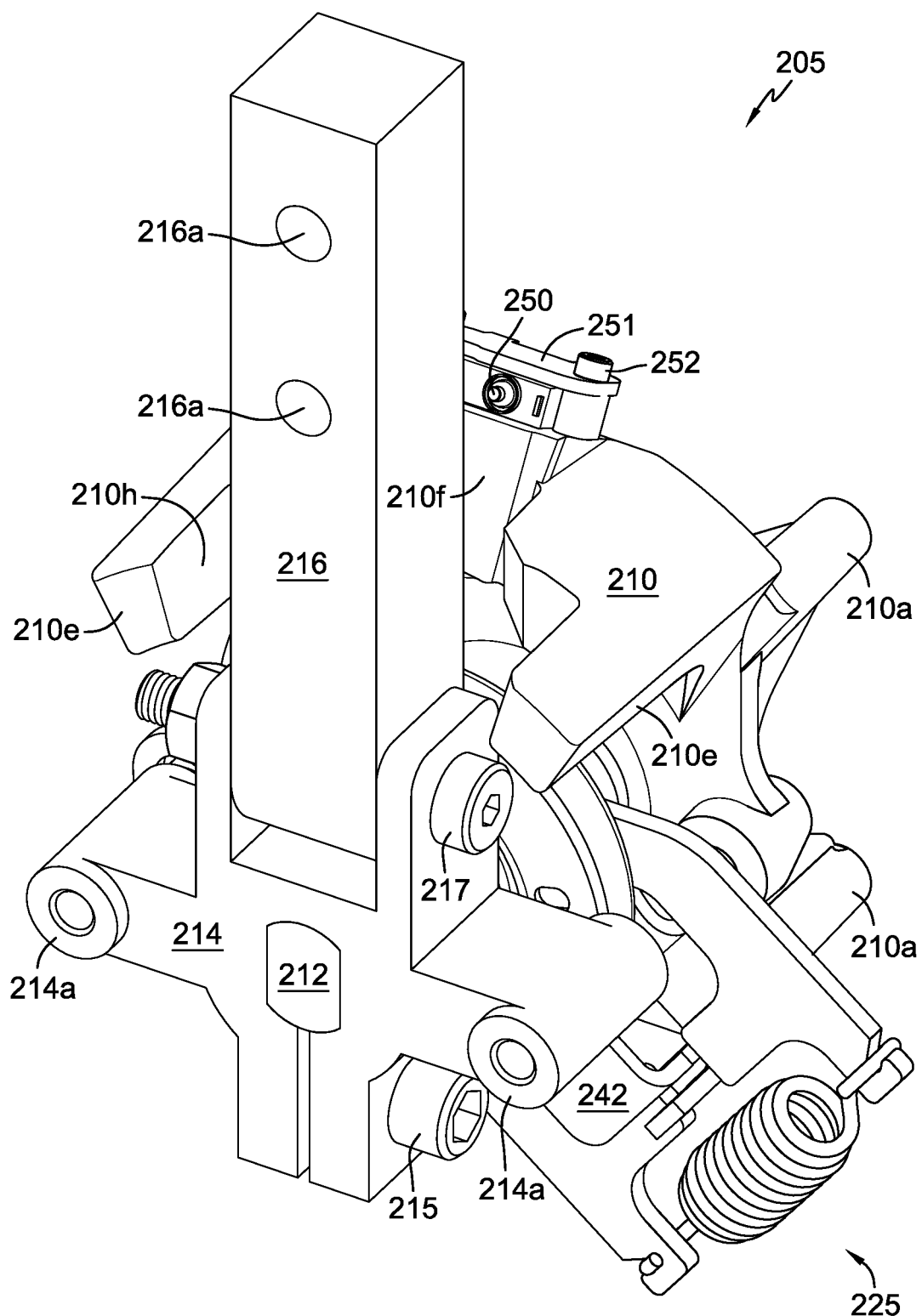
FIG. 10 is a perspective view of the control assembly of FIG. 9.
Figure 11:
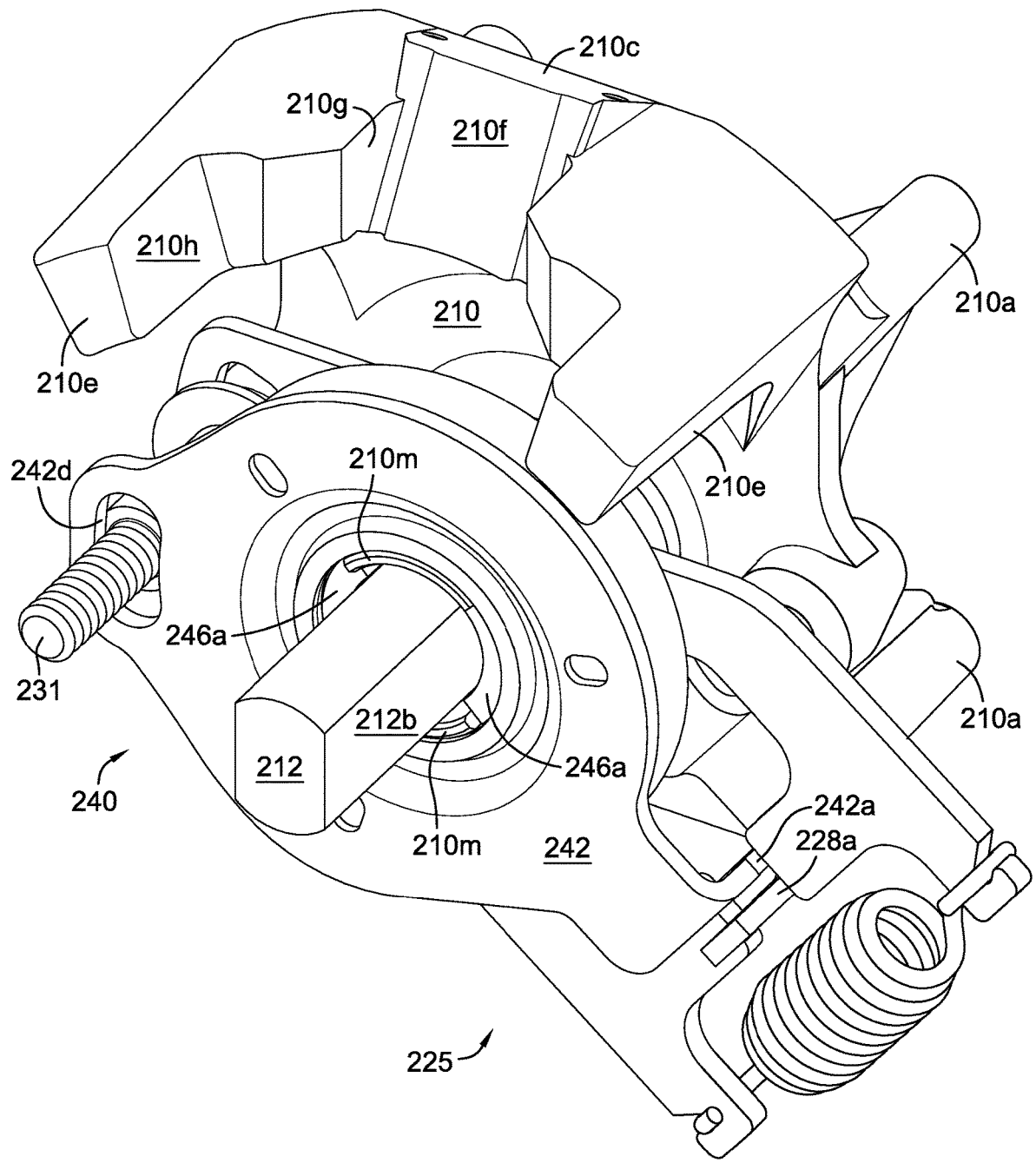
FIG. 11 is a perspective view similar to that of FIG. 10, but with certain components removed for clarity.
Figure 12:
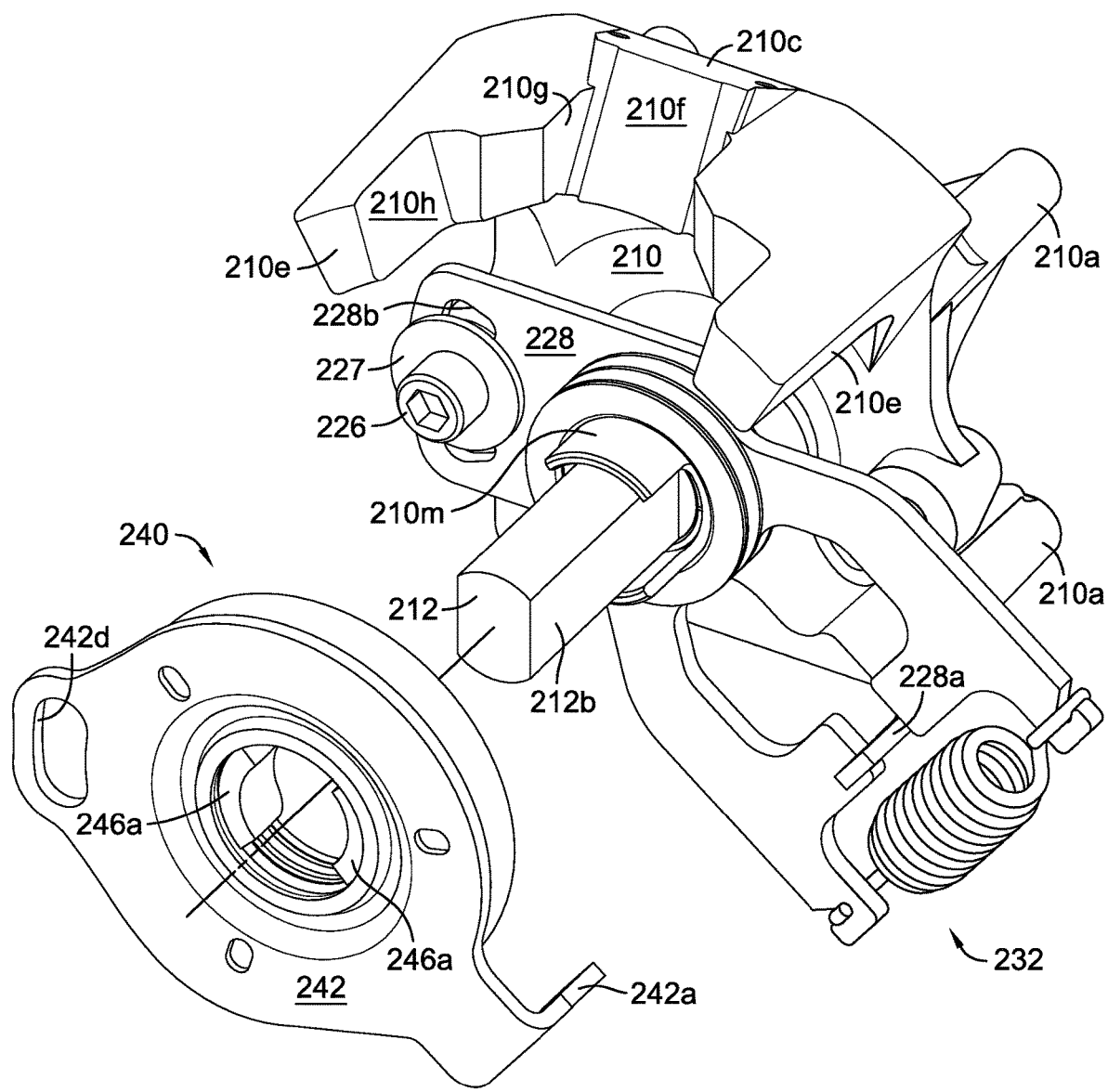
FIG. 12 is an exploded perspective view similar to that of FIG. 11.

As shown in, e.g., FIGS. 10 and 11, this embodiment incorporates a bracket 210 for connecting to vehicle frame 792 or other vehicle structure, and a similar pivot bar 216 is engaged to a yoke 214. Pivot bar 216 operates in a similar manner as before with respect to its ability to rotate about the axis of fastener 217 to engage and disengage from switch 250 and stop 210*f* on bracket 210. The comments above with respect to switch 150 apply to switch 250.

The RTN mechanism 225 includes a fixed neutral arm 228 and a bi-directional scissors RTN subassembly 232 similar in many respects to that previously described. Neutral arm 228 is mounted on a first machined step 210*i* and secured to bracket 210 at a boss 210*b* by means of a neutral set screw 226 extending through opening 228*b* in neutral arm 228. A neutral arm extension 228*a* is provided to establish the neutral return position of scissors RTN subassembly 232.

Yoke 214 is connected to and rotates shaft 212, as seen in FIG. 10. Yoke 214 also includes a pair of bosses 214*a*, one of which may be used to secure control arm 242 via fastener 231, which extends through opening 242*d* formed in control arm 242, in order to provide rotational force from yoke 214 to the control arm 242. Thus, control arm 242 need not be connected directly to shaft 212 as in the prior embodiment.

Figure 13:
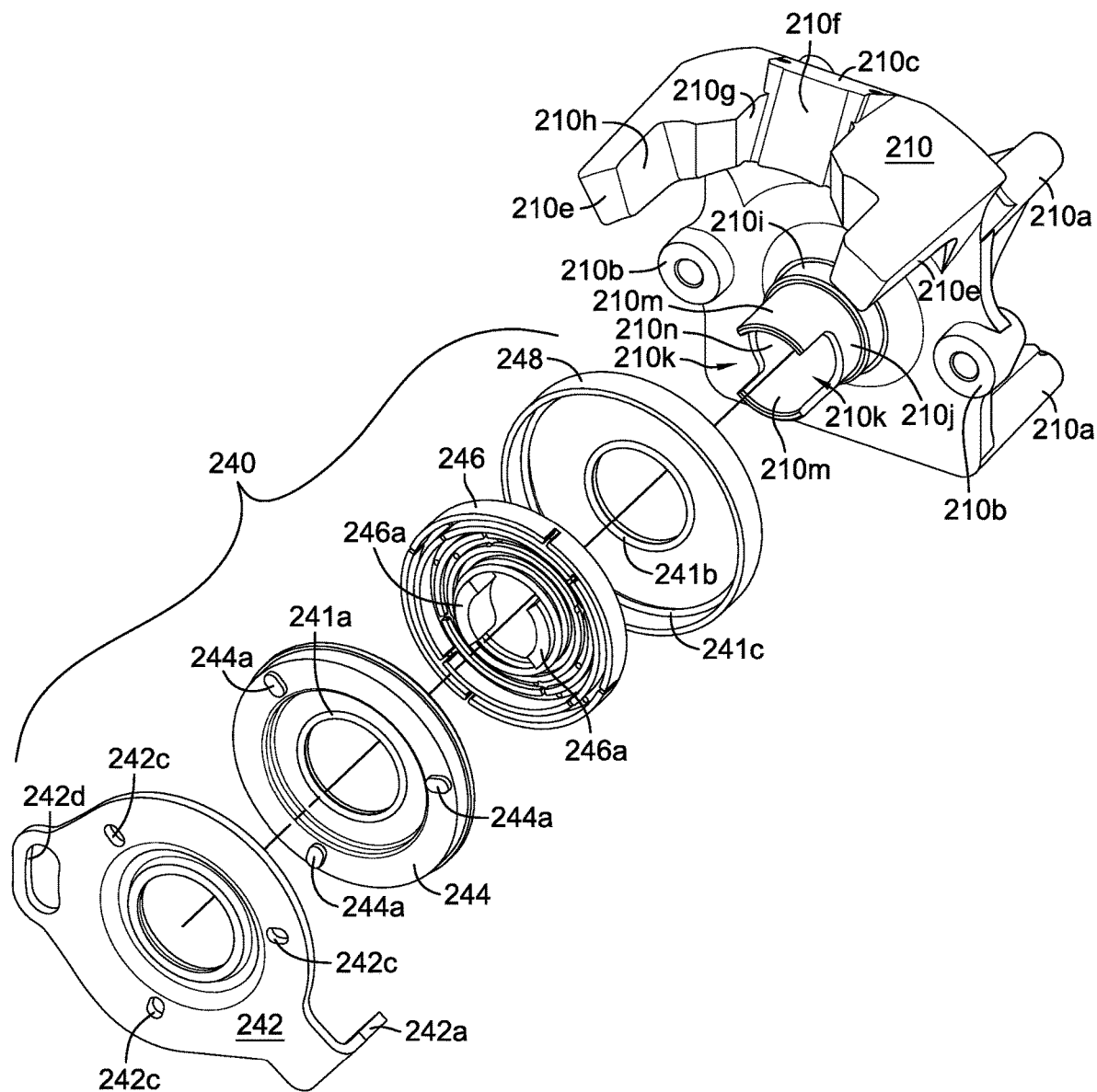
FIG. 13 is a further exploded view similar to FIG. 12 but with the components of the damper assembly being shown as exploded and the return to neutral components removed for clarity.

RTN mechanism 225 also includes a damper subassembly 240 comprising the control arm 242, which is shown most clearly in the exploded view of FIG. 13, and is similar in many respects to that taught in commonly-owned U.S. Pat. No. 8,459,137, the terms of which are incorporated herein by reference in their entirety. Although a control arm separate from damper subassembly 240 could be provided, inclusion of control arm 242 as an integral element of damper subassembly 240 reduces the overall size of RTN mechanism 225 and therefore, of speed control mechanism 205. A damper rotor 244 is positioned adjacent to and in contact with stator 246. As shown most clearly in FIGS. 12 and 13, bracket 210 includes a pair of damper mounting tabs 210*m* on which damper subassembly 240 is mounted. Mounting tabs 210*m* are formed as extensions of a second machined step 210*j*. Scissors RTN subassembly 232 is rotationally mounted on second machined step 210*j* between neutral arm 228 and damper subassembly 240.

Separating the pair of opposed mounting tabs 210*m* is a pair of opposed slots 210*k* which engage anti-rotation tabs 246*a* of stator 246 to prevent rotation of stator 246. Damper rotor 244 is connected to and rotates with control arm 242 by means of projections 244*a* that engage openings 242*c* on control arm 242. A cover 248 (also engaged to and rotating with control arm 242) is provided to house the stator 246 and rotor 244, and various O-rings, such as O-rings 241*a*, 241*b* and 241*c* are used as necessary to seal damping fluid inside damper subassembly 240. As will be understood, a portion of damper subassembly 240 (including control arm 242) is rotated by the operator and the interaction of damper rotor 244 with damper stator 246 damps the speed at which control arm 242 returns to the neutral position as dictated by RTN subassembly 232. Such damping improves the feel of certain vehicle maneuvers to the operator, as it prevents sudden deceleration.

Figure 14:
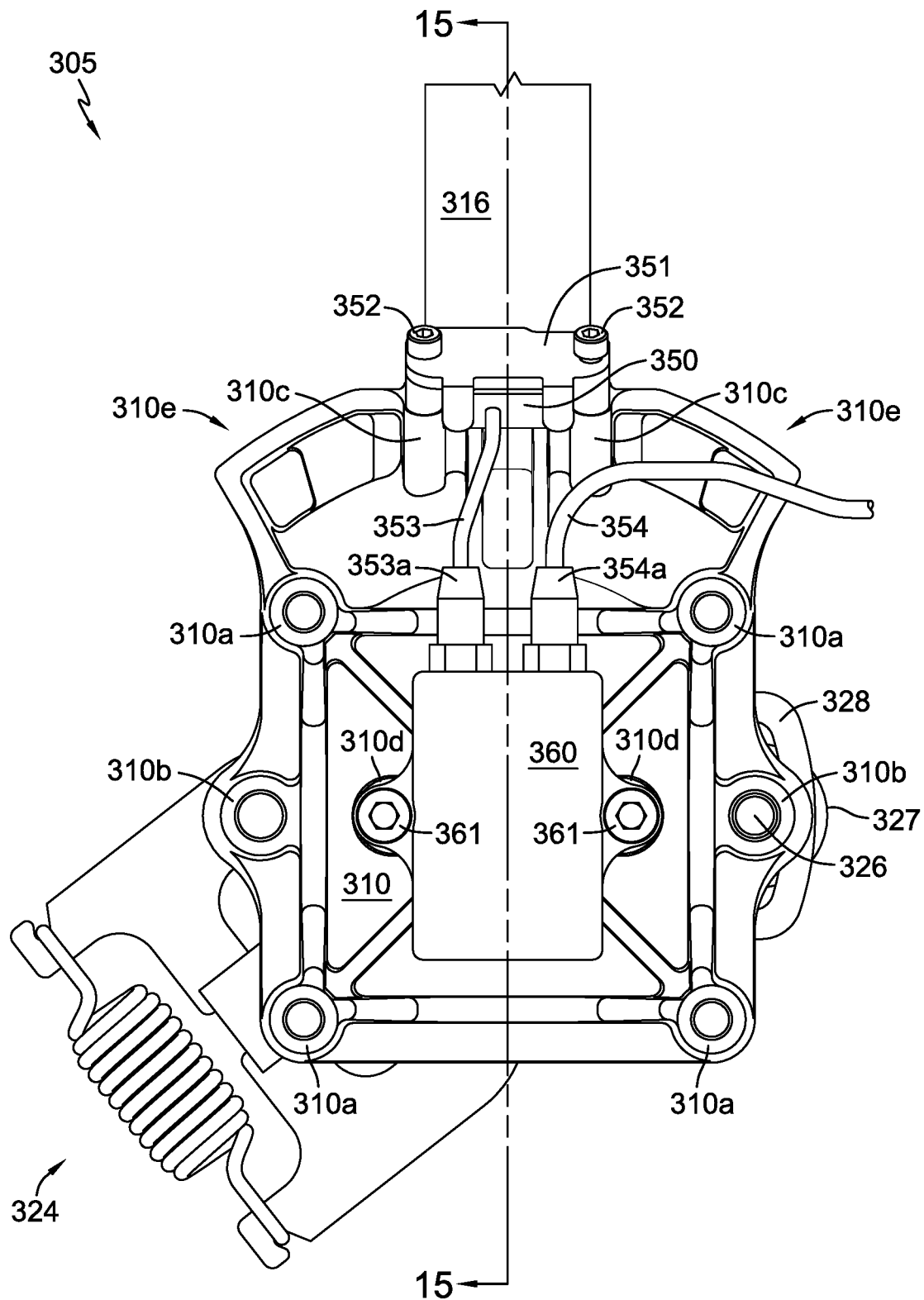
FIG. 14 is a side elevational view of a third embodiment of a control assembly in accordance with the teachings herein.
Figure 15:
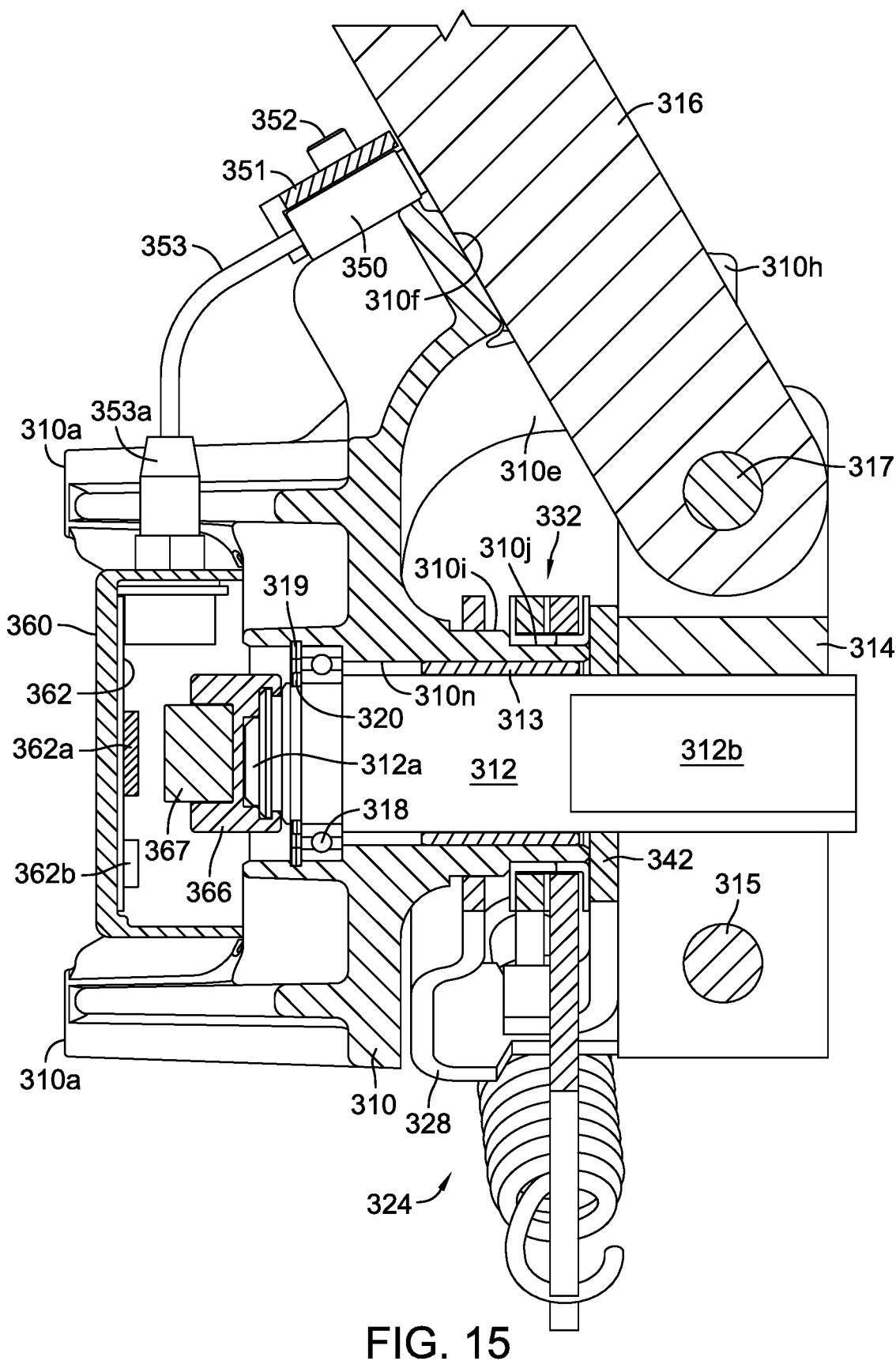
FIG. 15 is a cross-sectional view of the control assembly, along the lines 15-15 of FIG. 14.

A third embodiment of a speed control mechanism 305 is shown in FIGS. 14 and 15, and is similar in many respects to the first embodiment disclosed above, and pivot bar 316, yoke 314, RTN mechanism 324 and switch 350 operate in a manner similar to that previously described, and the prior comments with respect to switch 150 apply to switch 350. In this embodiment, a digital position sensor 360 is attached to bracket 310 by means of fasteners 361 attached to sensor mount bosses 310*d*. A magnet 367 is mounted to shaft tang 312*a* by means of a magnet housing 366, and the magnetic field of magnet 367 interacts with position sensor 360. A switch cable 353 is connected to the position sensor 360 by means of a first weatherproof connecter 353*a* and is also connected to switch 350. Position sensor 360 incorporates a circuit board 362 having a magnetic field sensor chip 362*a* and a microprocessor chip 362*b* comprising CAN Bus communication capability. CAN Bus cable 354 is also connected to the position sensor 360 by means of a second weatherproof connector 354*a* and is also connected to one of the controllers 771L or 771R on vehicle 790.

Figure 16:
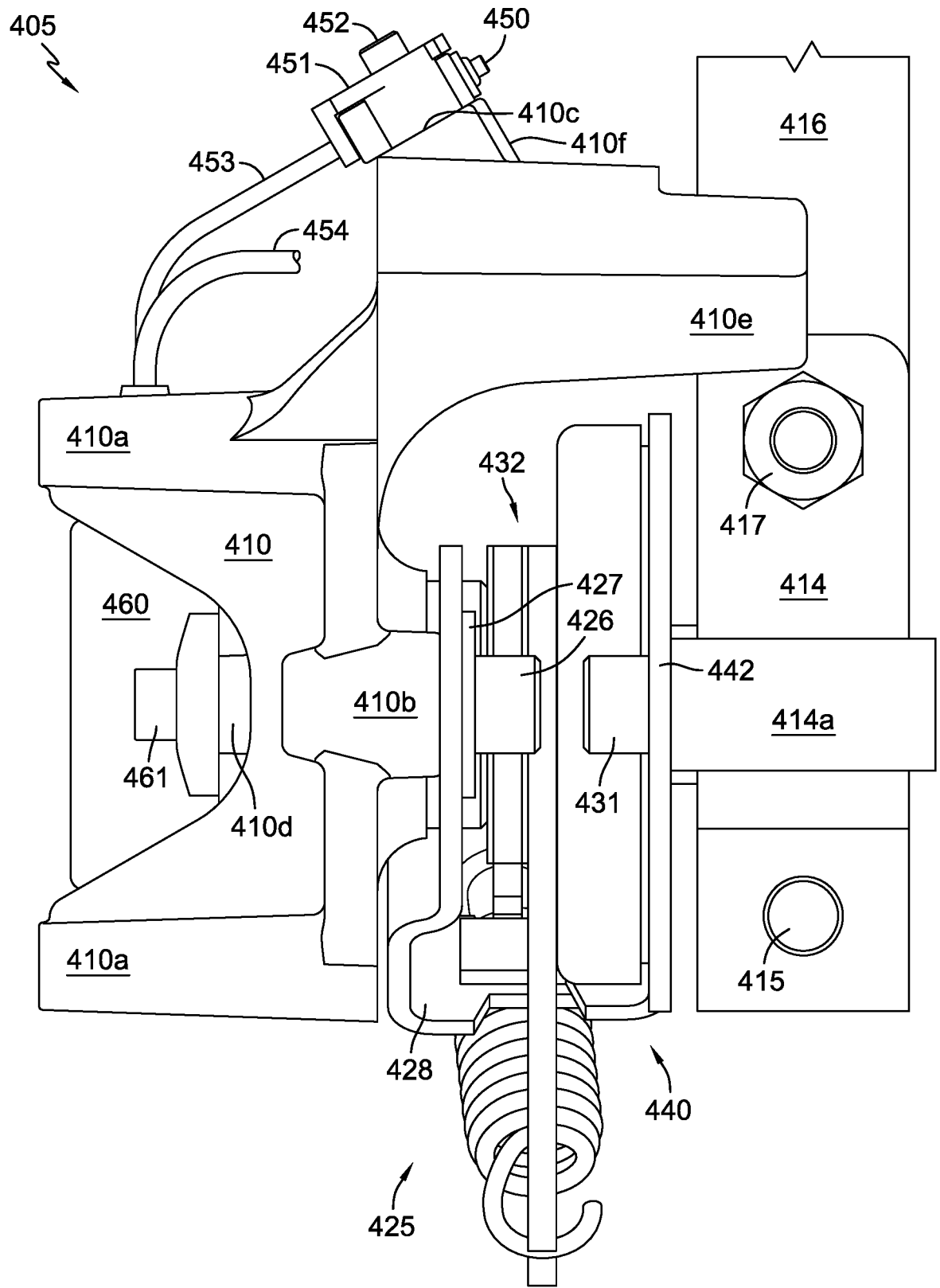
FIG. 16 is a right side (as oriented in vehicles described herein) front elevational view of a fourth embodiment of a control assembly in accordance with the teachings herein.

A fourth embodiment of a speed control mechanism 405 is shown in FIG. 16 and incorporates aspects of the second and third embodiments. Specifically, digital position sensor 460 operates in the same manner as digital position sensor 360 described above, and can include the same connections. Pivot bar 416, yoke 414, RTN mechanism 425 (including rotary damper subassembly 440), and switch 450 operate in a manner similar to that previously described for the speed control mechanism 205 of the second embodiment, and as before, the comments with respect to switch 150 apply to switch 450.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A control assembly for use with a vehicle having a drive system, comprising:
    a bracket attached to the vehicle;
    a yoke to which a pivot arm for a control lever of the drive system is attached;
    a shaft extending into the bracket and to which the yoke is engaged, wherein the shaft is configured to rotate relative to the bracket about an axis-of-rotation in a first direction and a second direction between a neutral position, a plurality of forward positions, and a plurality of reverse positions;
    a position sensor for sensing a position of the shaft, the position sensor comprising:
        a magnet attached to the shaft;
        a magnetic field sensor chip positioned adjacent the magnet; and
        a microprocessor chip configured to communicate via a CAN bus with an electronic controller connected to the drive system; and
    a return-to-neutral assembly configured to engage to the pivot arm to provide a return force to the pivot arm when the shaft is rotated about the axis-of-rotation away from the neutral position, the return-to-neutral assembly comprising:
        a pair of return arms;
        a neutral arm and a control arm configured to engage the pair of return arms when the shaft rotates from the neutral position; and
        a spring attached between the pair of return arms to bias the shaft to the neutral position.

2. The control assembly of claim 1, wherein the neutral arm is fixed to the bracket in a non-rotatable manner.

3. The control assembly of claim 2, wherein the pair of return arms are rotatably coupled to a step protruding from the bracket.

4. The control assembly of claim 3, wherein the control arm is attached to the shaft such that the control arm rotates with the shaft.

5. The control assembly of claim 3, further comprising a damper configured to damp movement of the shaft toward the neutral position when the spring causes the control arm to return to the neutral position.

6. The control assembly of claim 5, wherein the control arm is connected to the damper such that the control arm rotates with the damper.

7. The control assembly of claim 1, wherein the bracket comprises a first arm and a second arm, wherein the first arm provides a first limit of rotational movement of shaft in the first direction about the axis-of-rotation, wherein the second arm provides a second limit of rotational movement of the shaft in the second direction about the axis-of-rotation.

8. The control assembly of claim 1, wherein each of the control arm and the neutral arm has an extension that is configured to engage one of the pair of return arms as the shaft rotates from the neutral position.

9. The control assembly of claim 8, wherein, when the shaft rotates in the first direction, the extension of the control arm is configured to engage a first of the pair of return arms and the extension of the neutral arm is configured to engage a second of the pair of return arms.

10. The control assembly of claim 9, wherein, when the shaft rotates in the second direction, the extension of the control arm is configured to engage the second of the pair of return arms and the extension of the neutral arm is configured to engage the first of the pair of return arms.

11. The control assembly of claim 8, wherein, when the extensions of the control arm and the neutral arm engage the pair of return arms, the spring is configured to apply a return force to the control arm and the neutral arm via the pair of return arms to return the shaft to the neutral position.

12. The control assembly of claim 1, wherein the yoke is attached to a proximal end of the shaft that is located on a first side of the bracket and the magnet is attached to a distal end of the shaft that is located on a second side of the bracket.

13. The control assembly of claim 12, further comprising retaining rings to retain the distal end of the shaft on the second side of the bracket.

14. The control assembly of claim 13, further comprising a shaft bushing positioned between the shaft and the bracket within an aperture.

15. A vehicle, comprising:
    a first drive system and a second drive system, wherein the first drive system is configured to drive a first driven wheel and the second drive system is configured to drive a second driven wheel;
    a first electronic controller and a second electronic controller, wherein the first electronic controller is configured to control operation of the first drive system and the second electronic controller is configured to control operation of the first drive system;
    a prime mover configured to power the first drive system and the second drive system; and
    a first control mechanism and a second control mechanism operatively, wherein the first control mechanism is engaged to the first drive system and the second control mechanism is operatively engaged to the second drive system, wherein each of the first control mechanism and the second control mechanism comprises:
        a bracket;
        a pivot arm connected to a control lever;
        a yoke to which the pivot arm is attached;
        a shaft extending into the bracket and to which the yoke is engaged, wherein the shaft is configured to rotate relative to the bracket about an axis-of-rotation in a first direction and a second direction between a neutral position, a plurality of forward positions, and a plurality of reverse positions;
        a position sensor for sensing a position of the shaft, the position sensor comprising:
            a magnet attached to the shaft;
            a magnetic field sensor chip positioned adjacent the magnet; and
            a microprocessor chip configured to communicate via a CAN bus; and
        a return-to-neutral assembly configured to engage to the pivot arm to provide a return force to the pivot arm when the shaft is rotated about the axis-of-rotation away from the neutral position, the return-to-neutral assembly comprising a pair of return arms, a neutral arm, and a control arm, wherein the neutral arm and the control arm are configured to engage the pair of return arms when the shaft rotates from the neutral position.

16. The vehicle of claim 15, wherein the neutral arm is fixed to the bracket in a non-rotatable manner and the pair of return arms are rotatably coupled to a step protruding from the bracket.

17. The vehicle of claim 16, wherein the control arm is attached to the shaft such that the control arm rotates with the shaft.

18. The vehicle of claim 16, wherein each of the control arm and the neutral arm has an extension that is configured to engage one of the pair of return arms as the shaft rotates from the neutral position.

19. The vehicle of claim 16, wherein the return-to-neutral assembly further comprises a spring attached between the pair of return arms, wherein, when the control arm and the neutral arm engage the pair of return arms, the spring is configured to apply a return force to the control arm and the neutral arm via the pair of return arms to return the shaft to the neutral position.

20. The vehicle of claim 19, further comprising a damper configured to damp movement of the shaft toward the neutral position when the spring causes the control arm to return to the neutral position, wherein the control arm is connected to the damper such that the control arm rotates with the damper.

* * * * *